Figure 1:
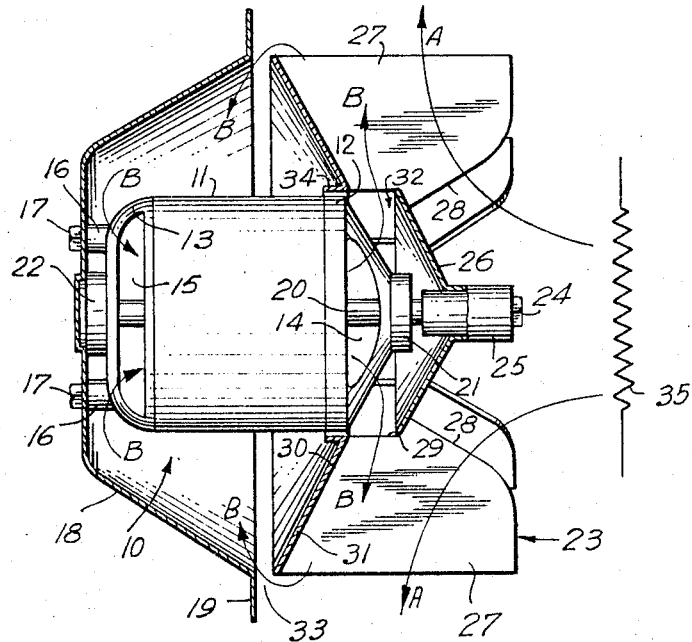

Sept. 20, 1966     J. I. R. BOIVIE     3,274,410

COOLING ARRANGEMENT FOR MOTOR-FAN UNIT

Filed Dec. 17, 1963

INVENTOR.

Jean Ivan Ragnar Boivie

BY Edmund A. Jenander his ATTORNEY

United States Patent Office 3,274,410
Patented Sept. 20, 1966

3,274,410
COOLING ARRANGEMENT FOR MOTOR-
FAN UNIT
Jean Ivan Ragnar Boivie, Stockholm, Sweden, assignor to Aktiebolaget Electrolux, Stockholm, Sweden, a corporation of Sweden
Filed Dec. 17, 1963, Ser. No. 331,266
Claims priority, application Sweden, Dec. 21, 1962,
13,886/62
11 Claims. (Cl. 310—62)

The present invention relates to a cooling arrangement for an electric motor-fan unit, particularly of the type used in automobile heaters.

In the case of automobile heaters, the heating element serving to heat the air is frequently located at the inlet side of the fan so that the electric motor operates in a region of increased temperature. Thus, if a standard motor is used which is dimensioned to provide the desired power when operated continuously at normal room temperature, this can result in overheating of the motor unless some provision is made for the cooling thereof.

It is an object of the present invention to provide a particularly simple cooling arrangement for the motor, which arrangement consists essentially in a particular configuration of the fan wheel so that, upon rotation thereof, it generates a vacuum at the end of the motor facing the fan wheel and thereby produces a continuous flow of cooling air through the motor.

In a preferred embodiment of the invention, the fan wheel includes a dished disk secured on the shaft projecting from one end of the motor and being concave at the axial side facing the motor, and blades extending from the disk in planes parallel to the axis of rotation, said blades projecting beyond the edge of the disk both in the radial direction and axially in the direction toward which the disk is concave so that, upon rotation of the fan wheel, the blades centrifugally generate the desired vacuum within the concavity of the dished disk at said one end of the motor and thereby induce a cooling air flow through the motor from the other end of the latter to said one end. The fan wheel further preferably includes an annular plate dished in the same direction as the disk, the annular plate being secured to the edges of the fan blades which project beyond the edge of the disk in the axial direction toward which the disk is concave, with the inner edge of the annular plate being spaced axially from the edge of the disk to define an annular slot therebetween through which the cooling air can exit radially outward after passing through the motor.

If the motor is of the enclosed type, as is generally the case, openings are provided in accordance with the invention in the two bearing brackets forming the ends of the motor housing in which case there can also be provided a bowl-like shell which surrounds the motor from the other end of the latter and extends towards the outer periphery of the fan wheel, so as to produce a certain return flow of air between the periphery of the fan wheel and shell and through the motor housing.

Figure 2:
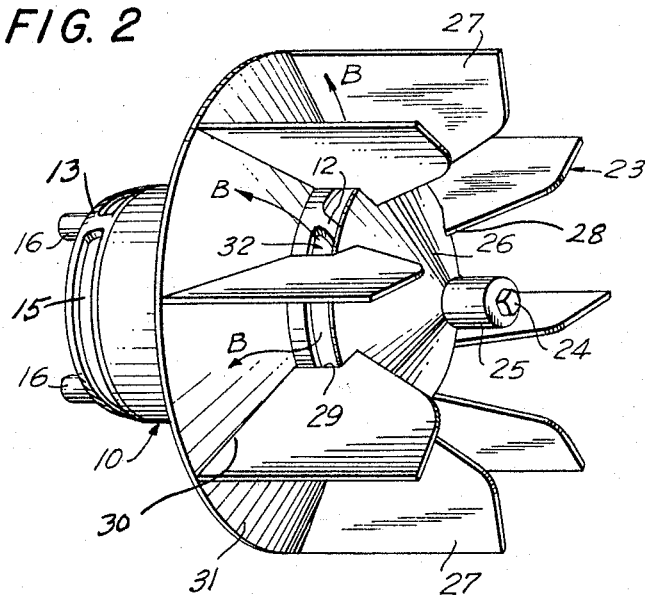

The above, and other objects, features and advantages of the invention, will be apparent in the following description of an illustrative embodiment which is to be read with reference to the accompanying drawing, in which:

FIG. 1 is a schematic side elevational view of a motor fan unit for automobile heaters which is provided with a cooling arrangement in accordance with the invention and shown in axial section; and FIG. 2 is a perspective view of the motor fan unit.

Referring to the drawing in detail, it will be seen that the motor there illustrated and generally identified by the reference numeral 10 is of the enclosed type, that is, has a housing formed of a shell 11, a front bearing bracket 12 and a rear bearing bracket 13. Openings 14 and 15 are formed in the bearing brackets 12 and 13, with only one opening for each bracket being shown in the drawing. The bearing bracket 13 has attachment lugs 16 (only two of which are shown) receiving screws 17 by which the motor 10 is secured inside of a depression or bowl-like shell 18 formed in a plate or partition wall 19 which may separate the motor fan unit, in sealed fashion, from the engine compartment so that dirt from the latter is prevented from penetrating into the fan system.

The motor 10 further has a shaft 20 journalled in bearings 21 and 22 carried by brackets 12 and 13, respectively. A fan wheel generally identified by the reference numeral 23 is secured on one end of shaft 20, that is, the end of the latter projecting through bearing 21.

As shown, the fan wheel is preferably of the radial or centrifugal type and, in accordance with this invention, fan wheel 23 includes a hub 25 secured, as by means of a screw 24, to the shaft 20 and being located at the center of a dished, preferably conical disk 26. The disk 26 has its concave side facing toward the motor 10 so as to extend over the bearing 21 of adjacent bracket 12, and, in the illustrated motor fan unit, the disk 26 has substantially the same diameter as the housing of motor 10. Fan blades 27 extend from the edge portion of disk 26 and preferably lie in planes parallel to, and spaced radially from the axis of rotation of the fan wheel, as is apparent on FIG. 2. Each blade 27 has a nose-like inner part 28 extending onto the edge portion of disk 26 at the convex side of the latter facing away from motor 10, and the blade projects radially outward beyond the edge of disk 26. Further, each blade 27 has an inner edge portion 29 extending from the nose-like inner part 28 parallel to the axis of rotation, that is, axially, beyond the edge of disk 26 in the direction in which the latter is concave and terminating closely adjacent to the periphery of bearing bracket 12 where the edge portion 29 meets an edge portion 30 extending outwardly at an acute angle relative to the axis of rotation which is substantially equal to the inclination of the generatrix of the disk 26. The edge portion 30 of each blade extends to the vicinity of the periphery of the depression 18.

The fan wheel 23 further includes an annular or ring-like plate 31 which is dished in the same direction as disk 26 and may be frustoconical, as shown. The annular plate 31 has an inner diameter substantially equal to that of disk 26 and an outer diameter substantially equal to the diametrical span of the blades 27. The annular plate 31 is secured to the edges 30 of the fan blades so that the inner edge of plate 31 is spaced axially from the edge of disk 26 to define a first annular gap or slot 32 therebetween, and the outer edge of plate 31 is spaced from the periphery of depression 18 to define a second annular gap of slot 33 therebetween. The inner edge of annular plate 31 is preferably joined to a flange 34 directed axially away from disk 26 and extending around the peripheral surface of bearing bracket 12 with a small radial clearance therebetween.

The above described arrangement of the unit 10 operates to cool the motor thereof as follows:

When the motor fan unit 10 is operated, the rotated fan wheel 23 draws in air axially at the center past a heating element schematically represented at 35 and propels the air radially outward in the direction indicated by the arrows A on FIG. 1. When the stream of air passes the edge of the dished disk 26, a vacuum is produced in the annular gap 32 between the edge of disk 26 and the inner edge of the annular plate 31. As the annular gap 32 communicates through the openings 14 of the front bearing bracket 12 and the openings 15 of the rear bearing bracket 13 with the interior of depression 18 which, in turn, communicates with the zone of high pressure at the periphery of the fan wheel through the gap 33, there is obtained a continuous ventilation or circulation of air through the motor housing in the direction indicated by the arrows B so that the motor is cooled, despite its proximity to the heating element. It is also evident that the cooling air drawn in through the annular gap 33 is taken in part from the fresh air entering through the fan inlet and in part from the air flowing outwardly through the annular gap 32 and which has already been used for cooling. Thus, a certain constant recirculation of cooling air through the motor takes place. The amount of this recirculation, as well as the total cooling air flowing through the motor per unit of time is determined not only by the speed of rotation of the fan wheel, but also by the absolute and relative dimensioning of the various parts thereof. Optimum values of recirculation and total cooling air flow exist for obtaining satisfactory cooling while at the same time keeping to a minimum the amount of the incoming fresh air used for the cooling.

Although an illustrative embodiment of the invention has been described in detail herein with reference to the accompanying drawing, it is to be understood that the invention is not limited thereto, and that various changes and modifications may be effected therein by one skilled in the art without departing from the scope or spirit of the invention as defined in the appended claims. Thus, by way of example, the generatrices of the surfaces of revolution constituting disk 26, annular plate 31 and depression or shell 18, where the latter is present, may be varied extensively from those shown so long as there is produced, at the end of the motor closest to the fan wheel, a vacuum giving rise to a flow of cooling air passing through openings in the bearing brackets of a fully enclosed motor or being directed by baffles when an open motor is employed.

What is claimed is:

1. In combination with an electric motor having a rotatable shaft extending from one end; a fan wheel comprising a central disk secured on said shaft and being spaced from said one end of the motor, and fan blades extending outward from the edge of said disk and projecting axially beyond said edge at the side of said disk facing toward said one end of the motor so that, upon rotation of said fan wheel, said blades create a vacuum intermediate said disk and said one end of the motor for producing a continuous flow of cooling air through the motor from the other end of the latter to said one end, the motor being of the enclosed type having a housing with bearing brackets at the opposite ends in which said shaft is supported, said bearing brackets having openings therein for permitting said flow of cooling air through the motor, said fan wheel further including an annular plate joined to said blades and having its inner periphery axially spaced from the edge of said disk in the direction toward said one end of the motor so as to define a first annular gap between said edge of the disk and said inner periphery of the annular plate for the outward passage therethrough of the flow of cooling air, said inner periphery of the annular plate extending closely around the bearing bracket of the motor at said one end of the latter; and further comprising a shell opening axially and receiving said motor with said one end of the latter extending from the shell, said shell having an edge extending along the outer periphery of said annular plate and spaced from the latter to define a second annular gap therebetween through which air is drawn into said shell to make up said flow of cooling air through the motor with said air drawn into the shell being constituted at least in part, of air passing outwardly from said first annular gap.

2. The combination as in claim 1; wherein said disk is dished so as to be concave at said side thereof facing toward said one end of the motor, and said annular plate is dished in the same direction as said disk.

3. The combination as in claim 2; wherein said disk and annular plate are conical surfaces of revolution defined by generatrices which are inclined at the same angle with respect to the axis of said shaft.

4. The combination as in claim 2; wherein the inner periphery of said annular plate has substantially the same diameter as said edge of the disk.

5. In combination, means defining a space having at least one open end, a wall which is transverse to the axis of the opening and extends radially outward therefrom at said one open end, an electric motor having a rotatable shaft projecting outward from at least one end thereof, means for mounting said motor with a portion thereof disposed in said space and at least said outward projecting shaft thereof positioned exteriorly of said space beyond said one open end thereof, a fan wheel including a hub and disk structure and a plurality of blades, means for fixing the hub on said outward projecting shaft, the disk structure extending radially outward from the hub and formed to define opposing concave and convex sides, the concave side facing the one open end of the space, the peripheral edge portion of the disk structure being disposed at the vicinity of the region at which the wall extends radially outward from the opening at said one end of the space and being spaced from the region to define an annular gap therebetween, the disk structure and the means defining the space providing a housing for the motor, and the blades being spaced from one another and fixed to the disk structure and extending axially of the motor shaft from the convex side of the disk structure in a direction extending from the one open end of the space.

6. Apparatus as set forth in claim 5 in which said motor is provided with openings at opposite ends thereof, the openings at the one end of said motor being disposed at the vicinity thereof from which said shaft projects outward therefrom, and said disk structure overlying said one end of said motor with the concave side thereof facing the openings at said one end thereof.

7. In combination, a wall member provided with an imperforate dished part having a bottom and a side wall defining a space having an open end, the side wall extending axially of the space from the bottom and terminating at a region defining the open end of the space, an electric motor comprising a stator and a rotor having a shaft, means journaling the rotor shaft on the stator for rotation thereon, means for mounting the stator on the wall member with at least a part of the motor disposed in the space, the rotor being rotatable about an axis extending axially of the space, the shaft of the rotor including a part projecting outside the space beyond the open end thereof, a fan wheel including a hub and disk structure and a plurality of blades, means for fixing the hub on the projecting part of the rotor shaft, the disk structure extending radially outward from the hub and formed to define opposing concave and convex sides, the concave side facing the open end of the space, the peripheral edge portion of the disk structure being disposed at the vicinity of the region at which the side wall of the dished part terminates at the open end of the space and being spaced from the region to define an annular gap therebetween, the disk structure and the dished part of the wall member defining an enclosure in which the motor is housed, and the blades being spaced from one another and fixed to the disk structure and extending axially of the rotor shaft from the convex side of the disk structure in a direction from the open end of the space.

8. Apparatus as set forth in claim 7 in which the annular gap between the peripheral edge portion of the disk structure and the region of the side wall of the dished part defining the open end of the space extends axially of the rotor shaft.

9. Apparatus as set forth in claim 7 in which the dished part of the wall member defines a truncated cone, the wall member at the immediate vicinity of the open end of the space being substantially normal to the axis of the truncated cone.

10. Apparatus as set forth in claim 7 in which a part of the motor projects beyond the open end of the space and the disk structure overlies the projecting part of the motor.

11. Apparatus as set forth in claim 7 in which the blades extend axially of the motor shaft a distance which is at least as great as the radius of the fan wheel.

References Cited by the Examiner
UNITED STATES PATENTS

| | | | |
|---|---|---|---|
| 1,244,334 | 10/1917 | Ilg | 310—60 X |
| 2,262,695 | 11/1941 | Moeller | 310—60 X |
| 2,494,772 | 1/1950 | McElroy | 230—117 |
| 2,709,035 | 5/1955 | Schmidt | 230—117 |
| 3,199,774 | 8/1965 | Lowell | 310—63 X |

MILTON O. HIRSHFIELD, *Primary Examiner.*

ORIS L. RADER, *Examiner.*

L. L. SMITH, *Assistant Examiner.*